Feb. 1, 1966  C. H. MUELLER ETAL  3,232,379
LUBRICATING APPARATUS
Filed April 15, 1963  5 Sheets-Sheet 1
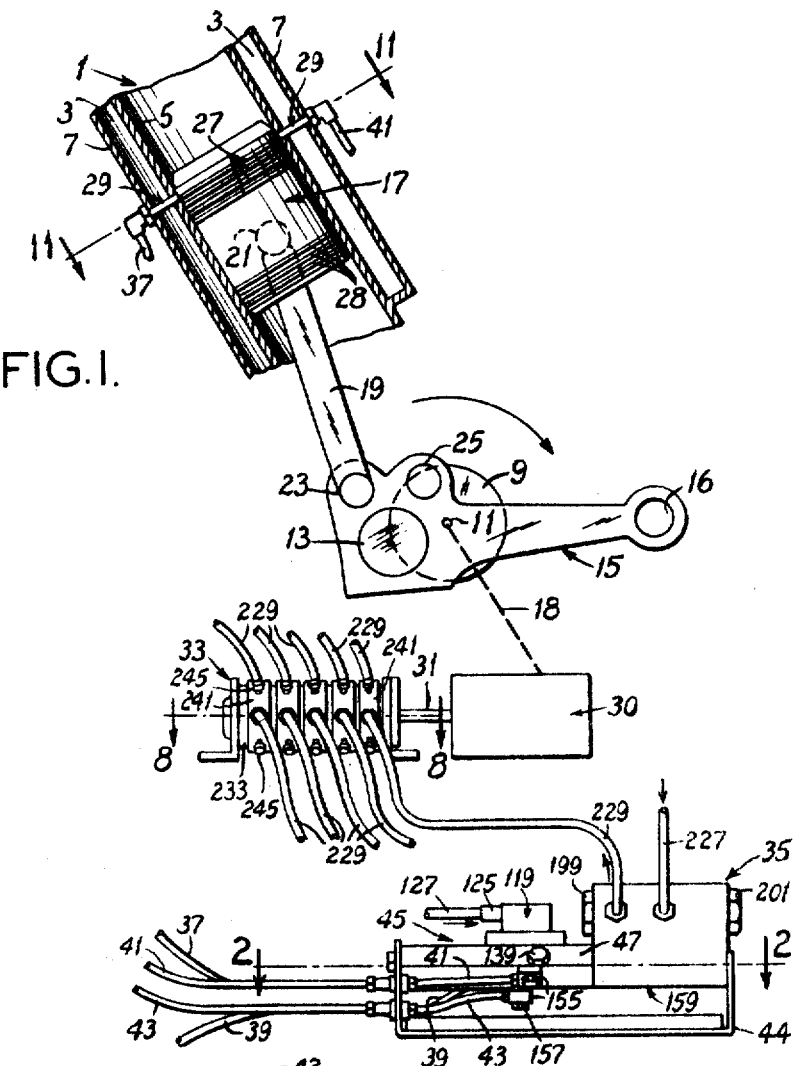
FIG.I.
FIG.II.
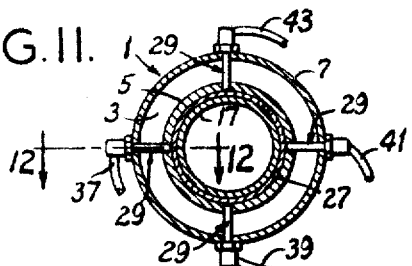
Carl H. Mueller,
Lutwin C. Potter,
Jerome B. Wegmann,
Inventors.
Koenig, Pope, Senniger and Powers,
Attorneys.

Feb. 1, 1966   C. H. MUELLER ETAL   3,232,379
LUBRICATING APPARATUS
Filed April 15, 1963   5 Sheets-Sheet 2

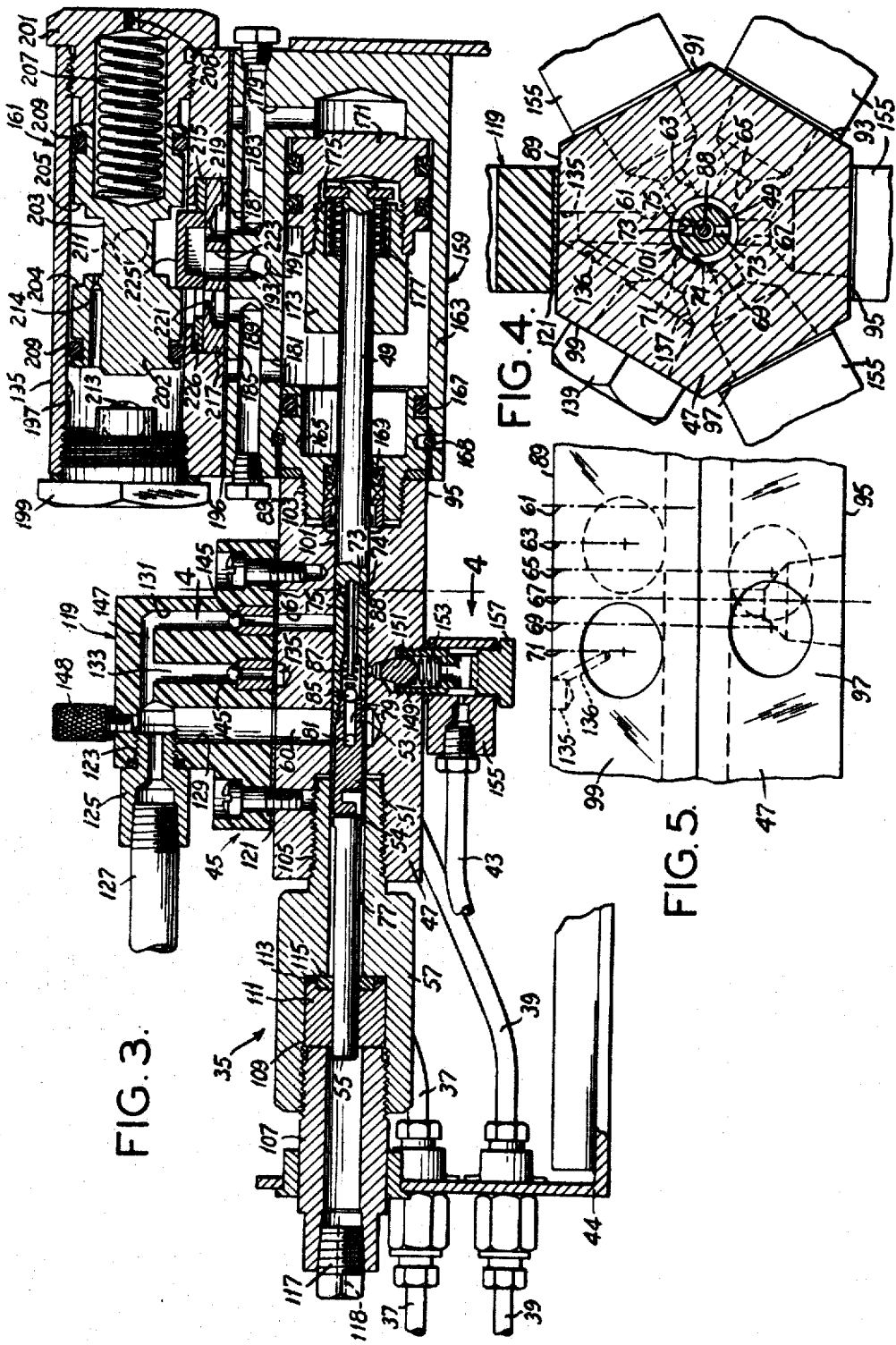

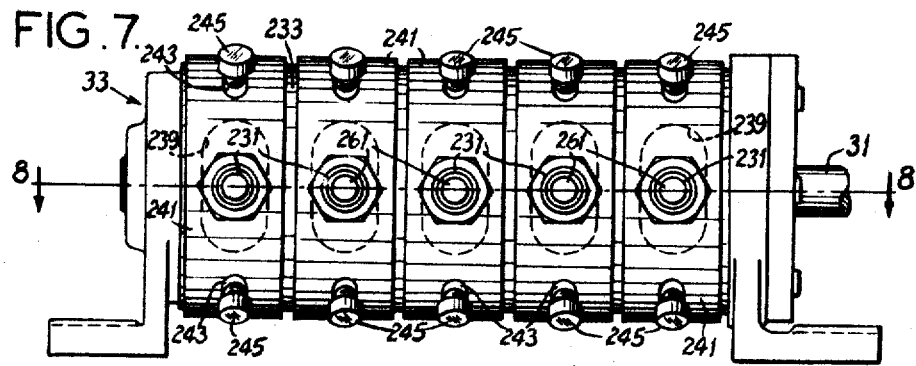
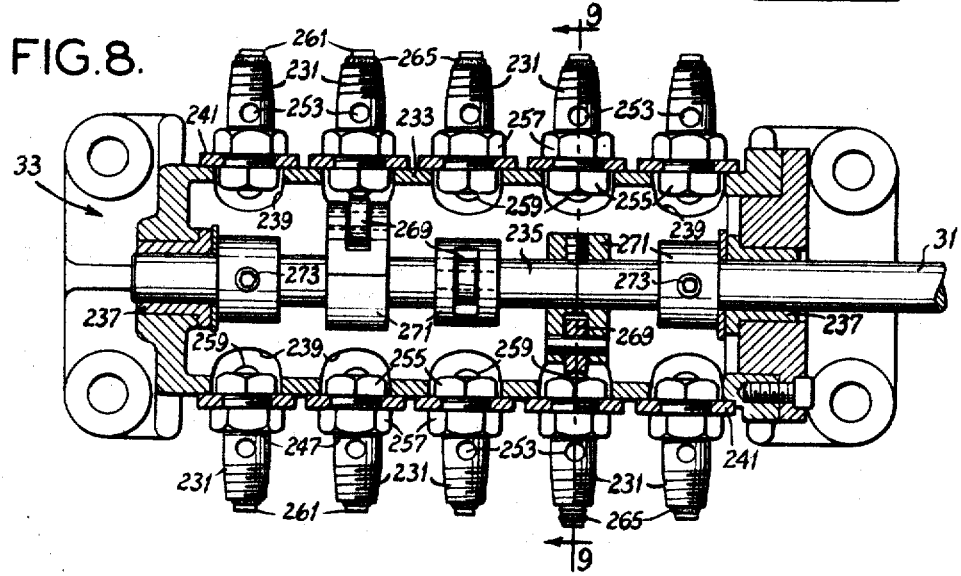
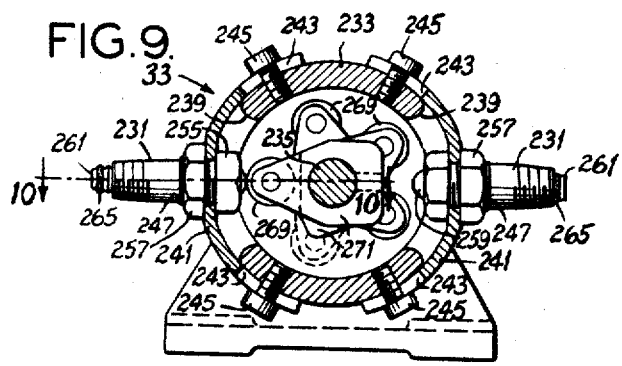

so that the lubricating apparatus is readily applicable to existing installations.

United States Patent Office 3,232,379
Patented Feb. 1, 1966

3,232,379
LUBRICATING APPARATUS
Carl H. Mueller, Pasadena Hills, Lutwin C. Rotter, Ladue, and Jerome B. Wegmann, Florissant, Mo., assignors to McNeil Corporation, a corporation of Ohio
Filed Apr. 15, 1963, Ser. No. 273,221
5 Claims. (Cl. 184—6)

This invention relates to a lubricating apparatus, and more particularly to apparatus for timed lubrication of moving machine elements, such as pistons of reciprocating engines.

Among the several objects of this invention is the provision of apparatus for rapidly discharging measured quantities of lubricant individually to one or more lubrication points on a moving element, and more particularly on a fast-moving element such as a piston; the provision of apparatus of the class described adapted to discharge lubricant as a particular portion of a piston or the like passes the point of discharge, such discharge being synchronized with the passing of said particular portion; the provision of this type of apparatus which is adapted automatically to discharge small measured charges of lubricant with a high velocity and under high pressure individually to a plurality of lubrication points on elements such as the piston rings of pistons of multi-piston reciprocating engines as the rings pass certain discharge points, the high velocity and high pressure preventing fouling by carbonization at said discharge points; and the provision of apparatus of this class which is economical to make, efficient in operation, and which is readily adaptable to installation on a wide variety of machines. Other objects and features will be in part apparent and in part pointed out hereinafter.

The invention accordingly comprises the elements and combinations of elements, features of construction, and arrangements of parts which will be exemplified in the constructions hereinafter described, and the scope of which will be indicated in the following claims.

In the accompanying drawings, in which one of various possible embodiments of the invention is illustrated, FIG. 1 is a schematic fragmentary view illustrating apparatus constructed according to the invention and applied to a reciprocating engine;

FIG. 3 is a section taken on line 3—3 of FIG. 2, parts being in a moved position;

FIG. 4 is a further enlarged fragmentary section taken on line 4—4 of FIG. 3;

FIG. 5 is a side elevation viewed from the left side of FIG. 4, parts being removed, the view diagrammatically illustrating the relationship between center lines of certain ports;

FIG. 7 is an enlarged side elevation of a portion of FIG. 1;

FIG. 8 is a section taken on line 8—8 of FIG. 7;

FIG. 9 is a section taken on line 9—9 of FIG. 8;

FIG. 11 is a section taken on line 11—11 of FIG. 1; and

Corresponding reference characters indicate corresponding parts throughout the several views of the drawings.

Figure 2:
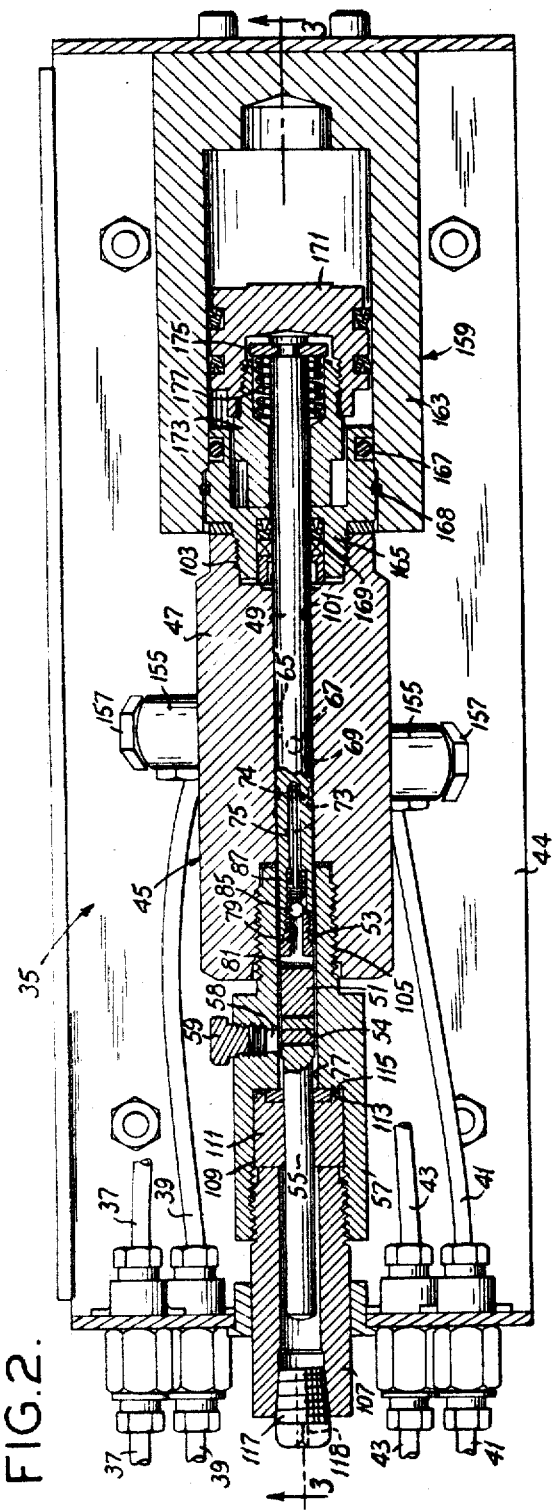
FIG. 2 is an enlarged fragmentary section taken on line 2—2 of FIG. 1.
Figure 10:
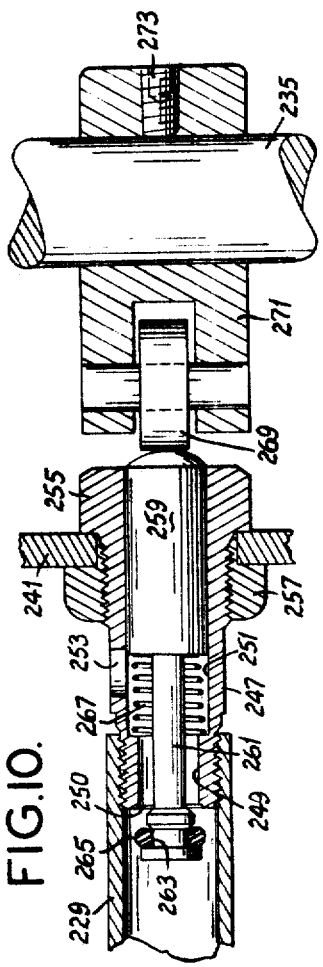
FIG. 10 is an enlarged section taken on line 10—10 of FIG. 9.

Referring now to FIG. 1 of the drawings, the lubricating apparatus of the invention is shown in connection with a cylinder 1. Cylinder 1 may be one of a pair of V-connected cylinders of a typical multi-cylinder V-type engine. This may, for example, have ten cylinders arranged in two V-connected banks of five cylinders each. A description of one cylinder of the engine will suffice for all cylinders.

Cylinder 1 has the usual water jacket 3 formed by inner and outer walls 5 and 7, respectively. The crankshaft 9 of the engine rotates on an axis 11. One crankpin of the crankshaft 9 is shown at 13. Journalled on crankpin 13 is a connecting rod assembly 15. Rod assembly 15 is adapted to be connected at 16 to a piston (not shown) of a compressor which may be driven by the engine. A piston 17 is located in cylinder 1. A connecting rod 19 is connected to piston 17 by a wrist pin 21 and to the connecting rod assembly 15 by a pin joint 23. A second pin joint 25 is provided in the rod assembly 15 adapted to form a connection with a connecting rod (not shown) of a second cylinder which may be located in the same vertical plane as piston 17 but in an adjacent bank of cylinders. The piston 17 has a plurality of upper piston rings 27. As shown, there are four such rings. A plurality of lower piston rings 28 are also provided. The parts thus far described are conventional and, as is obvious, present the usual problems connected with wear due to friction. Therefore, lubrication is required.

A formerly typical system for lubricating the inside of the cylinder and the piston in the cylinder includes a speed reducer connected to the crankshaft of the engine. The output shaft of the speed reducer drives a pump which pumps lubricant through a delivery line to a nozzle or the like in the cylinder wall to deliver lubricant into the cylinder. A normally closed check valve, adapted to open upon the build-up of a predetermined pressure, is located in the delivery line. During operation of the engine lubricant is pumped into the delivery line against the closed check valve. When the pressure on the upstream side of the valve reaches the predetermined amount, the check valve opens and lubricant is delivered through the nozzle. The upstream pressure is thus immediately relieved so that the valve recloses. This sequence of operations is then repeated. One of the significant disadvantages of this type of system is that the time and speed of discharge of the lubricant cannot be controlled with sufficient accuracy. Moreover, such a system is subject to carbonization of oil at the nozzles, with consequent fouling and clogging.

It is important that the piston rings be adequately lubricated but the former system does this indifferently and in most cases inadequately. This is because the lubricant is discharged under inadequate pressure and insufficiently accurate timing on the rings of pistons which generally move at comparatively high velocities. Hence only small portions of the lubricant may be actually discharged on the rings. In many cases the piston rings are at positions substantially removed from the plane of the discharge nozzle or nozzles as lubricant is discharged. In such case, the rings will not be adequately lubricated. In other cases the lubricant may be delivered into the cylinder in advance of the piston and thereby fail properly to lubricate even the cylinder walls.

By means of the present invention, lubricant is delivered with accurate, split-second timing at a very high velocity and under high pressure so that the lubricant is always delivered to the piston rings. Moreover, this is accomplished over long intervals of operation, without fouling of the nozzles. Referring to FIGS. 1 and 11, measured charges of lubricant, such as oil, are individually discharged through a plurality of injection nozzles 29. Several nozzles are spaced annularly around each cylinder. For example, as shown in FIG. 11, there are four nozzles spaced at 90° intervals around one cylinder. It will be understood that the number of nozzles and the spacing could be different if desired. The lubricant is delivered against the upper piston rings 27 substantially during the small interval of time which elapses as the rings pass the nozzles upon an upward piston stroke.

The means for discharging the lubricant includes a conventional speed reducer 30 connected to the crankshaft 9 by a suitable drive 18. An output shaft 31 connects the speed reducer to a timer 33. Timer 33 controls the operation of a plurality of lubricant dispensers generally indicated at 35. There is one lubricant dispenser 35 for each cylinder of the engine. Lubricant is discharged from each dispenser 35 through four delivery lines 37, 39, 41 and 43 to the respective nozzle 29 (see FIGS. 1 and 11). The operation of this apparatus is such that the crankshaft-controlled timer 33 causes the dispenser 35 to discharge a measured charge of lubricant throughout lines 37, 39, 41 and 43 and the respective nozzles 29 during the time that the upper rings 27 of the piston 17 pass the surrounding nozzles. As will be made apparent, the lubricant is discharged in a succession of spurts onto the piston rings of a given piston 17 once for every predetermined number of its upward strokes. Inasmuch as there is one multiple-injection lubricant dispenser 35 for each cylinder, a dispenser 35 will be described first. The timer 33 and nozzles 29 will be described subsequently.

Referring to FIGS. 2-5, a lubricant dispenser 35 is shown mounted on a U-shaped frame 44. Dispenser 35 includes a plunger pump or so-called differential injector 45. Injector 45 includes a cylinder 47 having a plunger 49 movable therein. A connector 51 of reduced circular cross section is threaded into the working end 53 of the plunger (its left end as viewed in the drawings). Connector 51 is attached by a hooked connection 54 to an extension 55. Hooked connection 54 permits a slight amount of play between extension 55 and the rigid assembly comprising the connector 51 and the plunger 49. Extension 55 extends through a passage 77 into a tubular sleeve 57 which is threaded into cylinder 47. Sleeve 57 has a lateral passage 58 into which a plug 59 is threaded (FIG. 2). Plug 59 may be removed for initially priming the lubricant system. The cylinder has a lateral inlet port 60 adapted for connection to a lubricant supply, as hereinafter made apparent. The cylinder 47 is also provided with a series or row of six longitudinally and angularly spaced ports 61, 63, 65, 67, 69 and 71. The spacing of the ports is diagrammatically illustrated in FIGS. 4 and 5, wherein the center lines of the ports are shown. The ports are located between the right end of the cylinder 47 and the inlet port 60. The plunger 49 has lateral ports 73 and a connected surrounding annular groove 74 spaced from its working end 53.

A central longitudinal passage 75 in plunger 49 extends from the lateral ports 73 to the working end 53. A space 77 is formed in the lubricant cylinder 47 around connector 51 and extension 55. The connector 51 has a longitudinal passage 79 in line with passage 75. Communication between passage 79 and space 77 is established by a lateral port 81 in connector 51. A ball check valve 85 is biased by a spring 87 toward the inner end of connector 51. The total length of the passages 75 and 79 is greater than the longitudinal distance from the inlet port 60 to the outlet port 61 nearest the right end of the cylinder. Check valve 85 is adapted to open upon movement of the plunger toward the left end of the cylinder. The plunger is movable from the charging portion illustrated in FIG. 3, wherein its working end 53 is adjacent inlet port 60, toward the left end of the cylinder through a pressure stroke. The means for moving the plunger through a pressure stroke will be described below. The plunger successively forces individual charges out through the outlet ports 61–71 as the lateral ports 73 and groove 74 pass the outlet ports. A pin 88 located within passage 75 prevents the check valve 85 and spring 87 from closing passage 75 during the pressure stroke of the plunger.

From the above it will be seen that the injector 45 as such is generally like that shown in United States Patent 2,694,977 and has the same unique function of positively delivering measured charges of lubricant individually to a plurality of lubrication points upon a single stroke of its plunger. The rapidity of the sequence of delivery of the measured charges depends upon the speed of advance of the plunger 49 which, as will be seen below, is very rapid.

The cylinder 47 is exteriorly formed as an elongate cylinder block of general hexagonal cross section, thereby having six flat sides 89, 91, 93, 95, 97 and 99 (see FIG. 4). It has a central longitudinal bore 101 with a counterbore 103 at the right end of the bore (FIG. 3) and a counterbore 105 at the left end. Sleeve 57 is threaded into the counterbore 105. A tubular extension 107 is threaded into a counterbored portion 109 of sleeve 57 and engages a tubular insert 111. Packing 113 is located between insert 111 and a shoulder 115 formed by counterbore 109. A plug 117 is threaded into the outer end of tubular extension 107. Plug 117 by reasons of a small bleed port 118 does not form an air-tight seal. Thus air within the extension 107 is forced out of the extension as the plunger moves through a pressure stroke, rather than being compressed in the extension. As will be made apparent hereinafter, plug 117 may be replaced with means for indicating the operation of the plunger 49 during initial timing of the apparatus. Extension 107 is mounted in the left leg of frame 44 as viewed in FIG. 3.

Figure 6:
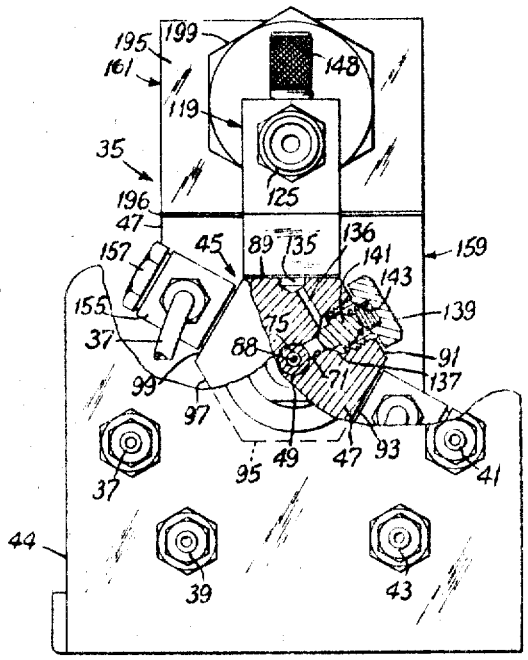
FIG. 6 is a left-end view of FIG. 3, parts being broken away.

Connected to the side 89 of the cylinder 47 is a transparent block 119, made for example of clear plastic. A sealing gasket 121 is located between the block and the cylinder 47. Block 119 has an inlet 123 in which a fitting 125 is located. A lubricant supply line 127 is attached to fitting 125. The lubricant supply line may lead from an elevated oil reserve for gravity feed of oil to the injector. Block 119 has a passage 129, establishing communication between the lubricant supply line and the inlet 60 in the cylinder 47, and also passages 131 and 133. The passage 131 is in register with the outlet port 61 in the cylinder and passage 133 is in register with a port 135 therein. Port 135 is connected to outlet port 71 in the cylinder by a passage 136 (see FIGS. 4 and 6) and a counterbore 137. A plug 139 is threaded into the counterbore 137 and houses a check valve 141 (FIG. 6). Valve 141 is biased by a spring 143 toward a closed position with respect to port 71. Both of the passages 131 and 133 include gravity-biased check valves 145. The passages 131 and 133 are commonly connected with inlet 123 by a passage 147. A plug 148 is threaded through block 119 into communication with the passages in the block to provide a convenient means for bleeding air from the system. As will be made apparent, passages 131, 133 and 147 provide a bypass or return circuit for outlet ports 61 and 71.

Each of the ports 63, 65, 67 and 69 is counterbored at its outer end to form a socket for receiving an outlet fitting 149 (FIG. 3). One such fitting is shown in FIG. 3 and its description will suffice for all of them. Each fitting 149 is counterbored for receiving a check valve 151 which is biased toward a closing position with respect to its outlet port by a spring 153. A transfer fitting 155 surrounds each fitting 149. The outer ends of fittings 155 are closed by heads 157 of outlet fittings 149. Each of the delivery lines 37, 39, 41 and 43 is connected to one transfer member 155. Thus, for example, line 37 is connected to outlet port 63, line 39 is connected to outlet port 65, line 43 is connected to outlet port 67 and line 41 is connected to outlet port 69.

When the plunger is in the FIG. 3 charging position, lubricant flows through passage 129 in block 119 and int 60 directly into the space 77 around the connector 51 and plunger extension 55. The lateral port 73 in plunger 9 is blocked. The relation of the longitudinal spacing of the successive outlet ports 61–71, the last outlet port 71 and the inlet port 60 to the width of the groove 74 is as follows: As the plunger is moved to the left from its charging position through a pressure stroke (FIG. 3 to FIG. 2), the groove 74 comes into communication with the first outlet port 61 as the end 53 of the plunger blocks off the inlet port 60. Groove 74 then comes into communication with each successive outlet port as the groove passes out of communication with the preceding outlet port. This is accomplished by making the intervals between the successive outlet ports equal to the width of the groove 74. By "interval" is meant the distance in the longitudinal direction from the trailing edge of any port (its left edge nearest the left end of the cylinder 47) to the leading edge (the right edge farthest from the left end of the cylinder 47) of the next successive port. The distance from the working end 53 of the plunger to the left edge of the groove 74 is made equal to the distance from the left edge of the inlet port 60 to the right edge of the first outlet port 61. Thus the groove 74 comes into communication with the first outlet port 61 as the working end 53 of the plunger reaches a position where it locks off the inlet port 60.

When the plunger is driven to the left from its charging position illustrated in FIG. 3, lubricant is displaced from within the space 77 through the inlet port 60. This occurs until the plunger reaches a position wherein it locks off the inlet port 60. At this time the left edge of the groove 74 first encounters the right edge of the first inlet port 61. Then, as the groove passes by the outlet port 61, the check valve 85 opens and a charge of lubricant is forced from the cylinder 47 through the passage 75, radial ports 73, groove 74 and outlet port 61. The amount of the charge of lubricant is determined by the displacement of the plunger as it moves during the time that the groove 74 is open to the port 61. It will be seen that this plunger displacement is equal to the width of the groove 74 plus the width (diameter) of the outet port 61. It will also be seen that the displacement, and accordingly the amount of lubricant forced through the outlet port 61, will be equal to the product of this distance and the cross-sectional area of the annular space between the cylindrical ports 51 and 56. The lubricant forced out through port 61 passes upward through passage 131, the check valve 145 opening to permit the lubricant to move into the passage 131. This lubricant is then returned by passage 147 to passage 129.

As the plunger continues its pressure stroke, the left edge of the groove 74 next encounters the right edge of the next outlet port 63 as the right edge of the groove is cut off from the preceding port 61. Then, as the groove passes by the port 63, a charge of lubricant is forced out of the cylinder 47 through this outlet port. The amount of this charge is determined in the same manner as the amount of the charge delivered through port 61. This lubricant passes into its respective outlet fitting 149, the respective check valve 151 being forced open by the lubricant. Assuming the system is fully primed, lubricant is forced through the delivery line 37 to the respective nozzle 29 in the cylinder 1. As the groove 74 passes by the outlet ports 65, 67 and 69, the above action is repeated to force lubricant through the respective lines 39, 43 and 41 to the remaining nozzles 29 surrounding the cylinder. As the groove 74 passes the last outlet port 71, lubricant is forced upward through the passages 136, 135, 133 and 147 to the passage 129. Thus, as the plunger is driven through a pressure stroke from its charging position illustrated in FIG. 3, equal small charges of lubricant are forced out of the cylinder 47 successively through the outlet ports one after the other. The first and last charges, i.e., the charges flowing through outlets 61 and 71, are returned to the passage 129 through the passages 131, 133 and 147. The remaining charges, i.e., the charges flowing through ports 63, 65, 67 and 69, cause equal charges of lubricant to be forced out of the nozzles 29 surrounding the cylinder 1. When the plunger is moved to a charging position, i.e., from its FIG. 2 position to its FIG. 3 position, the cylinder is recharged with lubricant flowing through passage 129 and inlet 60 for the next cycle of operation.

The mechanism for moving the plunger 49 comprises a fluid-operated (specifically air-operated) motor generally indicated at 159. Obviously a gas other than air may be employed. A control valve 161 is connected to the motor 159 for supplying and exhausting air to the motor. Air motor 159 includes a cylinder 163. A fitting 165 is threaded into the counterbored end 103 of cylinder 47. The fitting 165 is sealed within the open end of and connected to cylinder 163 by sealing ring 167 and locking ring 168. Plunger 49 extends through fitting 165 into the cylinder 163. Suitable packing 169 is provided between fitting 165 and cylinder 47.

A driving piston 171 is slidably mounted in cylinder 163. The piston is connected to the right end of plunger 49 by a tubular fitting 173 threaded into the piston. A washer 175 is located on plunger 49 adjacent, but spaced slightly from the end of fitting 173. This slight spacing prevents binding between the plunger and piston. A compression spring 177 is located between the washer 175 and the fitting 173. Passages 179 and 181 extend outward from opposite ends of the cylinder. Passages 183 and 185 respectively connect passages 179 and 181 to ports 187 and 189. An exhaust port 191 is connected to one side of the cylinder 163 by a port 193 located between ports 187 and 189.

The control valve 161 comprises a valve chest or housing 195 for containing the pressure fluid (specifically air) for operating the motor. A gasket 196 is located between valve chest 195 and cylinder 163. The chest 195 is provided with a longitudinal cylindrical bore 197 having end caps 199 and 201. A control piston 202 is slidably mounted in the bore 197. Piston 202 has a centrally located annular groove 203 and two annular shoulders 204, 205. A spring 207 reacting against end cap 201 biases the piston to the left as viewed in FIG. 3. A relief hole 208 permits air to enter and exhaust from the space in which the spring 207 is located during expansion and contraction of said spring. Rings 209 seal the piston in the bore 197. An inlet port 211 is provided in the central portion of the valve chest 195. An exhaust port 213 is provided in the valve chest adjacent end cap 199. A small air bleed passage 214 extends through piston 202 to establish a restrictive communication between the inlet and exhaust ports.

Located in a recess 215 in valve chest 195 is a valve seat 217. Seat 217 has three ports 219, 221 and 223 through it in register with the ports 187, 189 and 193, respectively. A distributing or so-called D-valve 225 is slidably mounted on valve seat 217. A framework 226 provides stops for limiting the movement of D-valve 225. In the position shown in FIG. 3, the D-valve connects ports 223 and 219. Upon movement of the piston to the left as viewed in FIG. 3, shoulder 205 engages the D-valve and causes it to move to the left, thereby blocking communication between the ports 223 and 219 and establishing communication between ports 221 and 223. When the piston moves to the right from its position at the left end of the bore 197, shoulder 204 engages the D-valve and moves it back to its FIG. 3 position.

Air inlet 211 is connected to air under pressure (ninety to one hundred p.s.i., for example), supplied from a source (not shown) through a line 227 (FIG. 1). Exhaust port 213 is connected by a line 229 to a normally closed control or trigger valve 231 of the timer 33. The details of valve 231 will be given below. Let it be assumed that valve 231 is in its normally closed position. Bleed passage 214 permits equalization of pressure on its opposite sides. Since the pressures against opposite sides of the groove 203 counterbalance one another, the pressure on the left end or face of the piston 202 will force it to the right as viewed in FIG. 3. This compresses the spring 207. The D-valve 225 is tripped by shoulder 204 to the right wherein ports 223 and 219 are in communication. Air passes from the inlet 211 around the loose-fitting piston 202 and through ports 221 and 189, passages 185 and 181 into cylinder 163 to the left of piston 171. The piston is thus forced to its FIG. 3 position. Air is exhausted through passages 179 and 183, ports 187, 219, D-valve 225, and ports 223 and 193 to the exhaust 191.

When valve 231 is opened, as hereinafter explained, air exhausts through port 213. Spring 207 immediately snaps piston 202 to the left from the FIG. 3 position against the cap 199. As the piston moves to the left, D-valve 225 is tripped by shoulder 205 to a position wherein ports 221 and 223 are in communication, and port 219 is in communication with the inlet 211. Air flows around the piston 202 through ports 219 and 187, passages 183 and 179 to the right end of the cylinder. The piston 171 and plunger 49 are thus forced to the left through a pressure stroke. The movement of the plunger through a pressure stroke is very fast, such as on the order of four-hundredths of a second. The measured dosages of lubricant are delivered to the nozzle 29 of the respective cylinder as described previously. During movement of the piston 171 to the left, air is exhausted through port 181, passage 185 and ports 189, 221, 223 and 193 to the exhaust 191.

The pressure under which lubricant is rapidly delivered is very high, such as 2000 p.s.i., for example. In view of this and the rapidity of successive injections afforded by the snap action of the plunger 49, lubricant is applied in rapidly successive spurts with considerable kinetic energy against the rings and ring area of the piston. As a result, the lubricant is better driven into the ring grooves for ring lubrication and subsequent migration to the cylinder walls. In addition, the high speed of movement of the lubricant under high pressure through the nozzles 29 scours them clear of carbon deposits which might otherwise tend to clog their outlets.

The timer 33 for controlling the opening and closing of the valve 231 is illustrated in FIGS. 1 and 7–10. For timing the apparatus when connected to a ten cylinder engine, there are ten valves 231, one for each lubricant dispenser 35. It will be understood that the valves 231 are identical and that therefore a description in connection with one will suffice for all.

The timer includes a cylindrical housing 233 mounted on a fixed support. A shaft 235 is rotatably journalled in bearings 237 located in the end walls of the housing 233. Housing 233 has a plurality of peripheral slots 239. As shown, there are ten slots 239, five on each of opposite sides of the housing. Each valve 231 by means of a locating bracket 241 is maintained in a fixed position in its slot 239. The brackets have forked ends 243. Screws 245 extend through the forked ends 243 and are threaded into the housing 233. Each bracket, by loosening its screws 245, may be moved a short distance around the periphery of housing 233 to place valve 231 in a desired location. It may then be locked in position by tightening its screws.

Each valve 231 comprises a tubular body 247 (FIG. 10) bored at 249 and counterbored at 251. A seat 250 is provided on the outer end of bore 249. A lateral exhaust opening 253 is provided in body 247. Line 229 is connected to the outer end of a valve 231. Valve body 247 has a head 255 located on the inside of bracket 241. A nut 257 clamps the valve 231 to bracket 241. A plunger 259 is slidably mounted in counterbore 251. Plunger 259 has a stem 261 which extends through bore 249 and which is grooved as indicated at 263. A valve sealing ring 265 is located in groove 263. Plunger 259 is biased inwardly (to the right as viewed in FIG. 10) by a spring 267. Under the bias of spring 267, ring 265 is engaged with seat 250. Thus valve 231 is normally closed.

Shaft 235 in connected to the output shaft 31 of the speed reducer 30. The speed reduction is such that the shaft 235 rotates 360° for every predetermined number of revolutions of the crankshaft desired between applications of lubricant to a piston. For example, for a crankshaft rotation of 300 r.p.m., shaft 235 may rotate at 4 r.p.m.

A cam 269 for actuating valve 231 is rotatably mounted on a carrier 271. Carrier 271 is fixed to shaft 235 by a locking screw 273. The distance between the center of shaft 235 and the outermost surface of cam 269 is greater than the distance between the center of shaft 235 and the inner end of plunger 259 when the latter is in its inner position. Thus when cam 269 contacts plunger 259 it will drive it to the left as viewed in FIG. 10. This movement unseats valve ring 265 and through port 253 establishes communication between the atmosphere and line 229. As shown, there are five cams 269. Once in every revolution of shaft 235, each cam will open two valves 231.

As valve 231 is opened by the respective cam 269, air is exhausted from the left end of the valve chest 195 (FIG. 3) through port 213, line 229 and valve 231. As described above, spring 207 rapidly drives piston 202 to the left (FIG. 3) against cap 199. The D-valve 225 is thus quickly tripped and piston 171 drives plunger 49 with a snap action through a pressure stroke. Lubricant is thus forced out the nozzles 29 in the manner above stated.

It will be understood that when the rings 27 reach the plane of the nozzles 29, the piston 17 is in a predetermined location. The crankshaft 9 is also in a predetermined rotative position. Since the shaft 235 is connected to crankshaft 9 by the speed reducer 30, the shaft 235 is also in a predetermined position when the rings 27 reach the plane of the nozzles 29. Although various parts of the control mechanism, i.e. valve 231, control piston 202 and D-valve 225, operate very fast upon initial opening of the valve 231, it will be understood that a short lead time, 0.185 second for example, does elapse between initial opening of valve 231 and commencement of movement of plunger 49 through a pressure stroke. The respective valve 231 is adjusted on housing 233 and the cam carrier 271 is adjusted on shaft 235 so that cam 269 will open the respective valve 231 at such time that (a) the air in valve chest 195 between end cap 199 and the left end of piston 202 will have been exhausted, (b) the spring 207 will have driven piston 202 to its FIG. 2 position, and (c) air will be supplied to the right-hand end of cylinder 159, just as the piston reaches the previously mentioned predetermined position. The lead time required between opening of valve 231 and the actuation of plunger 49 will vary with the length of the line 229 employed, and this fact is taken into account when initially timing the opening of valve 231. The opening of valve 231 triggers the lubricating operation so that lubricant is dispensed by a sequence of spurts on the piston rings 27 as they pass the nozzles 29. While the operation of only one valve 231 has been described, it will be understood that the remaining valves 231 are actuated in the same manner to initiate the lubrication of the piston rings of the remaining pistons.

The proper location of valves 231 on housing 233 and cam carrier 271 on shaft 235 may be determined by removing plug 117 (see FIG. 3) and temporarily inserting a switch (not shown) for controlling a stroboscopic light or other timing means. The switch is actuated by the end of the plunger extension 55 when the plunger is actuated. This will indicate the operation of the lubricant dispenser 35, thereby indicating whether the valve 231 should be actuated sooner or later to obtain optimum performance.

The components for timing form no part of this invention per se and further discussion is not necessary.

Figure 12:
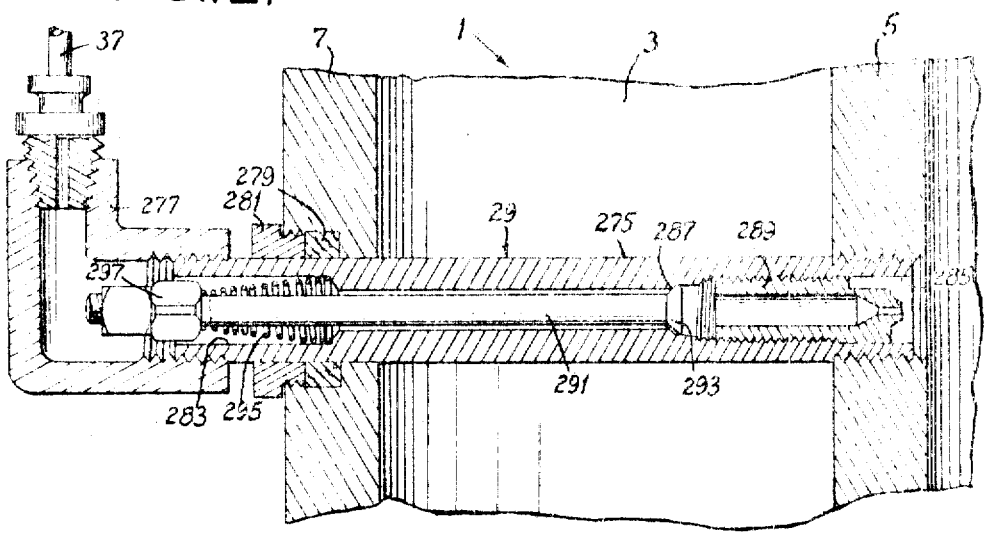
FIG. 12 is an enlarged section taken on line 12—12 of FIG. 11.

Referring now to FIG. 12, each nozzle 29 is shown to comprise a tubular sleeve 275 extending through the walls 5 and 7 of the water jacket 3. One of the lubricant delivery lines, 37 for example, is connected by an elbow 277 to the sleeve 275. The sleeve is threaded into the wall 5 surrounding the piston. Packing 279 is located in the outside wall 7 of the cylinder around sleeve 275. A nut 281 is threaded into the wall 7 for maintaining the packing 279 and sleeve 275 in place.

Sleeve 275 is counterbored as indicated at 283 and 285. The inner end of counterbore 285 is formed to provide a seat 287. A nozzle insert 289 is threaded into counterbore 285. Extending through the sleeve 275 is a stem 291 having a valve head 293 on its inner end. A spring 295 in counterbore 283 engages a nut 297 and outwardly biases the stem 291. When the stem is in its outermost position, valve head 293 is seated on seat 287. As the annular groove 74 in the plunger 49 passes port 63 and forces lubricant therethrough, the same amount of fluid is forced into sleeve 275. Valve head 293 is forced off seat 287 and lubricant is discharged through nozzle insert 289. Immediately after the fluid passes valve head 293, spring 295 pulls the valve head back onto seat 287. Thus, when the piston uncovers nozzle insert 289, any pressure in the cylinder cannot force lubricant or other material back through the sleeve. Moreover, as described above, the lubricant is discharged from nozzle insert 289 at high velocity and under high pressure, thus tending to blow out any foreign particles in or around the insert 289.

Assuming, as is the case in the present example of the invention, that the speed reducer 30 rotates shaft 235 one revolution for every 75 revolutions of the crankshaft 9, the operation of the apparatus with regard to one piston and its cylinder is as follows:

At a predetermined time, 0.185 second for example, prior to the time at which the top piston ring reaches the plane of nozzles 29, cam 269 opens valve 231. This opens exhaust port 213 of control valve 161. The control valve 161 operates to force air into the cylinder 163 to the right (FIG. 3) of the piston 171. The plunger 49 is driven through a pressure stroke. As the groove 74 passes port 61, lubricant is delivered through passages 131 and 147 in block 119 to inlet passage 129. As the groove 74 passes port 63, lubricant is forced through the port, line 37, sleeve 275, and nozzle insert 289 onto the upper piston ring just as the upper ring passes the plane of the nozzles 29. As the groove 74 successively passes the outlet ports 65, 67 and 69, small volumes of lubricant are successively forced through these ports respectively to the remaining three nozzles 29. The lubricant delivered through the nozle 29 which is connected to the port 69 is dispensed before the lower piston ring of the upper group of piston rings 27 has passed the plane of the nozzles. The time interval during which the lubricant is delivered in four spurts is about the time interval which elapses as the rings successively pass the plane of the nozzles. As groove 74 passes the last port 71, lubricant is delivered through passages 133 and 147 in block 119 to inlet passage 129. Since block 119 is transparent, the flow of lubricant through passages 131, 133 and 147 can be seen. Thus, a workman need only make a visual inspection of the block 119 to determine whether the lubricant dispenser is operating properly.

As the last piston ring 27 passes the nozzles 29, the cam 269 moves from plunger 259 and valve 231 closes. Air then bleeds through the passage 214 in the piston 202 of distributing valve 161 and causes the piston 202 to return to its initial position. The D-valve 225 is also returned and air is forced into the cylinder 163 on the left side (FIG. 3) of piston 171. The piston thus moves the plunger back to its original position through a charging stroke. After every 75 revolutions of the crankshaft 9, the above operation is repeated. If the crankshaft is making 300 r.p.m., the piston rings 27 of the piston are lubricated on four separate occasions every minute. It will be understood that the operation of this apparatus with regard to the remaining pistons of the engine is the same.

While the operation of this apparatus has been described with relation to lubrication of piston rings as a piston moves up in a cylinder, it may be timed to lubricate as the piston moves down. It is also applicable to the lubrication of other automatic machine parts, as will be clear from the above to those skilled in the art.

The invention is applicable not only to the lubrication of pistons of cycling reciprocating engines, but to the lubrication of any cycling mechanism in which it is desired to having a moving part rapidly lubricated during its passage or traversal with respect to another part relative to which it moves, such as cylinder 1. It will be noted that while the repeated operations of the lubricant dispenser 35 are synchronized with certain cycles of operation of the mechanism being lubricated, and may synchronously vary with the speeds of repetition of such cycles, the velocity of the pump plunger 49 during one of its strokes is substantially the same as during other strokes and is independent of the speed of the mechanism being lubricated. Thus when one of the valves 231 starts to open, the pressure relief at port 213 unbalances the forces on piston 202, thus releasing the spring 207 to expand rapidly. The result is a rapid or what may be called a snap action of slide valve 225 so as instantly to supply air behind the piston 171 of plunger 49. Thus, after expiration of the abovementioned lead time, the plunger commences its pressure stroke. The rapid inrush of air causes very rapid plunger action. The rapidity of plunger action is consistently high, regardless of the speed of the mechanism which is being lubricated. Since the area of the piston 171 is larger than the cross-sectional area of the annular space 77 around plunger extension 55, a comparatively high lubricant pressure is obtained with lower air pressure. Therefore, the lubricant is injected at the nozzle 29 at both high pressure and high speed regardless of the speed of the mechanism being lubricated. The lubrication resulting from the operation of this apparatus causes the operating temperature of the relatively movable parts of the mechanism to be less than the temperature usually attained.

A subcombinational feature of the invention is the construction of lubricant dispenser 35, whereby the stated rapid plunger action is obtained. By imbalancing the pressure on the piston 202 through the port 214 so as to compress the spring 207 and cock the valve 225 to an initial position, the plunger 49 is brought to its initial position. Then by releasing the pressure of port 213 by operation of its associated valve 231, the compression on spring 207 is at once released, whereupon the valve 225 is quickly snapped from its cocked position to its position wherein air is rapidly delivered to the piston 171 on plunger 49. The latter is therefore rapidly driven forward at the desred speed which is substantially independent of the rapidity with which the operation is repeated, which is to say, substantially independent of the speed of the mechanism which is being lubricated.

It will be appreciated that the spring 295 in each nozzle 29 which holds shut the valve head 293 is relatively weak, so that under the high pressure afforded by the plunger 49, each valve head such as 293 opens instantaneously as lubricant is forced up to it on its way to the nozzle insert 289.

It will be apparent that for a given operation of the plunger 49 a sequence of spurts of fast-moving lubricant under high pressure is obtained through the array of four nozzles 29. This is an advantageous feature but is not limited to the use of any partciular number of nozzles. Moreover, the invention is useful in cases in which only one pump outlet and one nozzle are employed to deliver lubricant in response to a stroke of the plunger 49. The high-speed action of the lubricant under high pressure occurs just as effectively in the single-nozzle case as in the multi-nozzle case.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Lubricating apparatus for a cycling mechanism, said mechanism including a first member and a relatively movable member having a portion periodically traversing a certain location on the first member, the traversals of said portion past said location being synchronous with the cyclic action of the mechanism, the speeds of traverse varying with the cycling rate; comprising an injector nozzle attached to said first member at said location, a gas-operated plunger-type lubricant pump connected with said nozzle and adapted to be rapidly operated from an initial position by application of gas pressure to one side of its plunger to deliver lubricant at substantial speed and at substantial pressure to said nozzle, said speed and pressure being substantially independent of said cycling rate and speeds of traverse, a gas distributor valve controlling operation of said pump, timing means controlling the operation of the distributor valve and thereby controlling the timing of the operation of the pump, a drive for the timing means, said drive including a connection with said mechanism for synchronous movement therewith, said drive and timing means being adapted to synchronize periodic operation of the pump with certain periodic traversals of said portion past the nozzle, the plunger of said pump being adapted to be returned to an initial position by application of gas to the other side of its plunger, a spring-biased means adapted in response to gas under pressure to be driven against its spring bias to a position in which said distributor valve causes the plunger to be returned, and valve means responsive to said timing means for releasing the gas pressure whereby the spring-biased means is rapidly spring-driven to its position causing said distributor valve to deliver gas to the plunger to effect a quick-operating stroke.

2. Lubricating apparatus for a cycling mechanism, said mechanism including a first member and a relatively movable member having a portion to be lubricated periodically while traversing a certain location on the first member, the traversals of said portion past said location being synchronous with the cyclic action of the mechanism; comprising at least one injector nozzle attached to the first member at said location, a lubricant pump having a lubricant cylinder containing a plunger and an outlet connected with said nozzle, the plunger of said pump being adapted by movement from a retracted to an advanced position to deliver a charge of lubricant through said outlet to said nozzle and upon movement from the advanced to the retracted position to draw lubricant into the cylinder, said plunger including a piston operative in a first air cylinder, a distributor valve adapted at a first position to direct air to said air cylinder to advance the plunger from the retracted to the advanced position to force lubricant to the nozzle, said distributor valve in a second position adapted to direct air to said air cylinder to retract the plunger from its advanced to its retracted position, a second air cylinder which communicates with opposite ends of the first air cylinder, means for operating said distributor valve comprising a control piston having an operating connection with the distributor valve and being reciprocable in said second air cyclinder, said communication being under control of said distributor valve, said control piston having a peripheral groove, an end face spaced from the groove and a restrictive air passage in the control piston between said face and said groove, an air inlet port in said second air cylinder located to be in comunication with said groove in any position of the control piston, an exhaust port connecting with said second air cylinder and communicating with the space therein adjacent said face, a control valve for said exhaust port adapted to be opened and closed, timing means controlling the opening action of said exhaust control valve, means biasing the control piston in a direction adapted to move said distributor valve from its second to its first position when said exhaust control valve is opened, and a drive for said timing means, said drive including a connection with said mechanism for synchronous movement therewith, said drive and timing means being adapted to synchronize periodic operation of said exhaust control valve in accordance with certain periodic movements of said portion which traverses said location.

3. A lubricant injector pump comprising a lubricant cylinder having at least one lubricant outlet, a plunger adapted by movement from a retracted to an advanced position to deliver a charge of lubricant through said outlet and upon movement from the advanced to the retracted position to draw lubricant into the cylinder, said plunger including a piston operative in a first air cylinder, a distributor valve adapted at a first position to direct air to the air cylinder to advance the plunger from the retracted to the advanced position, said valve in a second position adapted to direct air to the air cylinder to retract the plunger from its advanced to its retracted position, means for operating said valve comprising a second air cylinder which communicates with opposite ends of said first air cylinder, a control piston having an operating connection with the valve and being reciprocable in said second air cylinder, said communication being under control of said valve, said control piston having a peripheral groove, an end face spaced from the groove and a restrictive air passage between said face and said groove, an air inlet port in said second air cylinder located to be in communication with said groove in any position of the control piston, an exhaust port in said second air cylinder adapted to be opened and closed and communicating with the space adjacent said face, and means biasing the control piston in a direction adapted to move said valve from its second to its first position when said exhaust port is opened.

4. Lubricating apparatus for a cycling mechanism, said mechanism including a first member and a relatively movable member having a portion periodically traversing a certain location on the first member, the traversals of said portion past said location being synchronous with the cyclic action of the mechanism, the speeds of traverse varying with the cycling rate; comprising an injector nozzle attached to said first member at said location, a gas-operated plunger-type lubricant pump connected with said nozzle and adapted to be rapidly operated from an initial position by application of pressurized gas to a first side of its plunger to deliver lubricant at substantial speed and at substantial pressure to said nozzzle, said speed and pressure being substantially independent of said cycling rate and speeds of traverse, the plunger of said pump being adapted to be returned to said initial position by application of pressurized gas to a second side of its plunger, a gas distributor valve controlling operation of said pump, gas-pressure-operated means for forcing said distributor valve toward a position in which gas is delivered to said second side of said plunger for moving the plunger to its initial position, means responsive to release of gas pressure in said gas-pressure-operated means to drive said distributor valve to a position in which gas is delivered to the first side of the plunger to deliver lubricant, a relief valve for periodically releasing said gas pressure in said gas-pressure-operated means, timing means controlling the periodic operation of said relief valve, a drive for said timing means, said drive including a connection with said mechanism for synchronous movement therewith, said drive and timing means being adapted to synchronize periodic operation of the relief valve with certain periodic traversals of said portion past the nozzle.

5. Lubricating apparatus for a cycling mechanism, said mechanism including a first member and a relatively movable member having a portion periodically traversing a certain location on the first member, the traversals of said portion past said location being synchronous with the cyclic action of the mechanism, the speeds of traverse varying with the cycling rate; comprising a plurality of injector nozzles attached to said first member at said location, a gas-operated lubricant pump having a piston-operated plunger, said pump being connected with said nozzles and adapted to have its plunger rapidly operated from an initial position by application of pressurized gas to a first side of its piston to deliver lubricant at substantial speed and at substantial pressure successively to said nozzles, said speed and pressure being substantially independent of said cycling rate and speeds of traverse, the plunger of said pump being adapted to be returned to said initial positon to draw in lubricant by application of pressurized gas to a second side of its piston, a gas distributor valve controlling operation of said pump, gas-pressure-operated means for forcing said distributor valve toward a position in which gas is delivered to said second side of said piston for moving the plunger to its initial position, means responsive to release of gas pressure in said gas-pressure-operated means to drive said distributor valve to a position in which gas is delivered to the first side of the piston to deliver lubricant, a relief valve for periodically releasing said gas pressure in said gas-pressure-operated means, timing means controlling the periodic operation of said relief valve, a drive for said timing means, said drive including a connection with said mechanism for synchronous movement therewith, said drive and timing means being adapted to synchronize periodic operation of the relief valve with certain periodic traversals of said portion past the nozzle.

References Cited by the Examiner

UNITED STATES PATENTS

| 1,849,380 | 3/1932 | Pawlikowski | 184—18 |
| 2,694,977 | 11/1954 | Rotter | 103—188 |
| 2,738,861 | 3/1956 | Emele et al. | 184—6 |
| 2,840,276 | 6/1958 | Dreyer et al. | 222—334 |

FOREIGN PATENTS 805,619  12/1958  Great Britain.

LAVERNE D. GEIGER, *Primary Examiner.*

MILTON KAUFMAN, *Examiner.*